United States Patent [19]

Lehmkuhl

[11] Patent Number: 4,944,643
[45] Date of Patent: Jul. 31, 1990

[54] TORQUE THRUST AND SURFACE SENSING DEVICE

[76] Inventor: Robert A. Lehmkuhl, 72 Carpenters Ridge, Cincinnati, Ohio 45241

[21] Appl. No.: 348,772

[22] Filed: May 8, 1989

[51] Int. Cl.$^5$ ............................................. B23B 49/00
[52] U.S. Cl. ..................................... 409/80; 279/1 A; 408/3; 408/6; 408/11; 409/187; 409/194
[58] Field of Search ................... 408/3, 6, 10, 11, 12, 408/13, 14; 409/80, 127, 187, 193, 194, 196, 218; 279/1 A, 1 ME; 33/556, 558, 559, 561

[56] References Cited

U.S. PATENT DOCUMENTS

| | | | |
|---|---|---|---|
| 4,193,720 | 3/1980 | Machida | 408/6 X |
| 4,507,025 | 3/1985 | Fedor | 408/6 |
| 4,579,487 | 4/1986 | Lehmkuhl | 408/6 X |
| 4,612,831 | 9/1986 | Lehmkuhl | 408/3 X |
| 4,778,313 | 10/1988 | Lehmkuhl | 408/3 X |
| 4,784,539 | 11/1988 | Lehmkuhl | 409/80 |

Primary Examiner—Steven C. Bishop
Attorney, Agent, or Firm—Edward J. Utz

[57] ABSTRACT

A tooling device for numerically controlled machining centers having programmable torque, thrust and surface sensing utilizing a telescopic tool holder comprising an adapter to be retained in the taper of the machine spindle and a control rod in the spindle attached to an actuating rod having electronic coupling means to control the axis feed rate of the computer numerical control for controlling deceleration of the spindle and a transducer for producing a signal to feed the spindle to a programmable depth and to measure the tool thrust and torque and to sense the location of work surfaces with random length tools and also be able to control feed rate of tool proportional to tool thrust or torque.

12 Claims, 10 Drawing Sheets

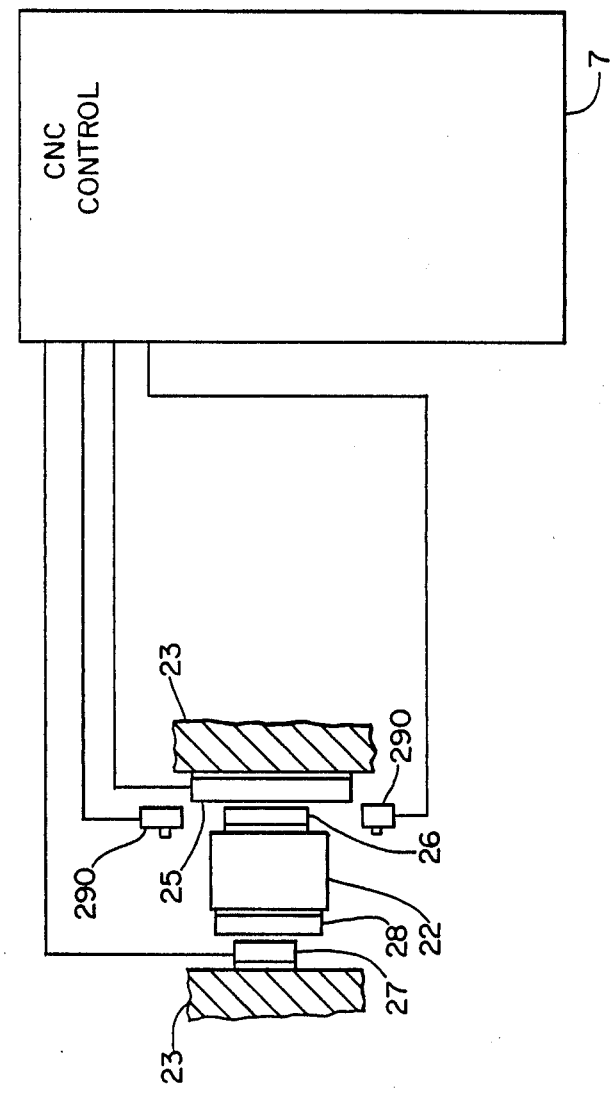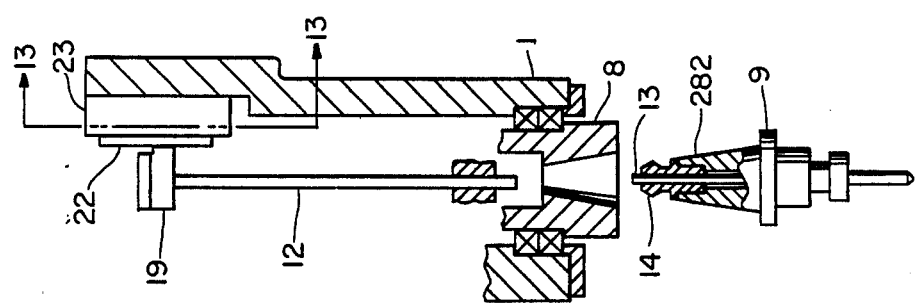

TORQUE THRUST AND SURFACE SENSING DEVICE

OBJECTIVE

In machining centers that are used in an operator attended environment or in the case when such machining centers are part of a work cell or Flexible Manufacturing System, it is desirable to have tooling systems that can communicate with and/or be controlled by the machine system Computer Numerical Control.

The principle object of my invention is to provide spindle mounted sensing devices to operate the machine mounted encoder or transducer for sensing excessive drill thrust and excessive torque.

Another object of my invention is to provide spindle mounted tool adapters to operate the machine mounted sensitive encoder or transducer for sensing the location of work surfaces with random length tools.

Another object of my invention is to provide spindle mounted tool adapters to operate the machine mounted position sensitive encoder or transducer for sensing breakage of adapter mounted tools.

Previous to my invention it was necessary to reference torque or thrust sensing tools to a position known as the "R" plane, therefore, another object of my invention is to eliminate the necessity for the reference plane, thereby reducing cycle time.

Still another object of my invention is to eliminate in programming of the workpiece the "R" plane dimension when using torque or thrust sensing tool.

Another object of my invention is to eliminate the use of preset tools and set-up time for setting tool length offsets when using torque or thrust sensing tools.

Another object of my invention is to provide a spindle mounted adapter to operate the machine position sensitive encoder for sensing excessive torque for small drills.

Another object of my invention is to provide a spindle mounted adapter to operate the machine mounted position sensitive encoder for sensing excessive thrust and torque for small drills.

Another object of my invention is to provide a spindle mounted adapter to operate the machine mounted position sensitive encoder or transducer to sense excessive torque for extremely small tools and also to control the amount of torque on the tool by controlling the force on a spindle control rod by the machine CNC, or by reading the force on the control rod during machining and sense a broken tool by a drop in force on the spindle control rod.

Another object of my invention is to provide a means for measuring the change in amount of torque during the cutting cycle.

Another object of my invention is to provide a means for measuring the change in amount of thrust during the cutting cycle.

PRIOR ART

In CNC machining centers, non-telescoping tool holders are used in conjunction with an "R" plane setting and therefore cycling to the "R" plane setting, and measuring the distance from the tool point to the work surface and manually adjusting the tool length for each tool used. Alternatively, manually preset tools are employed. Another method is to utilize spindle and table probe cycles which are time consuming and expensive.

In previous telescoping tool adapters described in U.S. Pat. No. 4,579,487 issued Apr. 1, 1986, it was necessary to use an integral mounted torque arm to work in conjunction with a machine mounted transducer.

In previous "Intelligent Tool System" U.S. Pat. No. 4,778,313, issued on Oct. 18, 1988, for surface sensing adapters, no provisions were made for sensing excessive tool thrust or excessive tool torque.

To overcome these economic and operating disadvantages, I have provided surface sensing telescoping tool adapters with a means of sensing excessive thrust consisting of an adapter having an adapter body arranged to be retained in the taper of the machine spindle. A spring loaded sliding tool holder is fitted to the bore of the tool body, driven by a sliding key and retained by stop blocks. A tool holder actuating rod is secured to the sliding tool holder and extends through the center of the tool body and retention knob that is used to operate with the power tool locks in standard machining center spindles.

Located between the inside end of the tool holder and the seat in the bore of the adapter body is a compressable spring preloaded sub-assembly, preset to compress when the desired tool thrust is reached.

The tool actuating rod establishes contact with a spindle control rod that operates through the center of the spindle and power tool lock mechanism.

The spindle control rod is rotatably connected to a sliding element and functions as described in the "Intelligent Tool System" U.S. Pat. No. 4,778,313, and operates as follows: The position and force on the sliding element is controlled by the machining center CNC by means of a position sensitive encoder or transducer in combination with a linear electric servo motor. In operation the servo motor retracts the spindle control rod until after the spindle power tool lock has the tooling devices securely retained in the spindle taper. At this point the spindle control rod is advanced by the servo motor with a reduced current level until it contacts the tool actuation rod. The position of the encoder is processed by the machine CNC to establish a "0" set point and to verify tool presence and type of tool in the spindle. Each type of tooling device has its unique initial position.

A variety of tool adapters can be used to accommodate the type of machining required for drilling operations with a machining center, a tool adapter arranged with a collet type tool holder is generally used. The collet assembly is mounted in the sliding tool holder.

In the drilling operation the spindle tool adapter is moved to the work surface at a rapid traverse rate until the drill contacts the work surface. At this point, the drill stops advancing, but the spindle continues to move toward the work surface. This causes the tool holder to telescope into the tool body which in turn causes the tool actuating rod to move the spindle control rod and sliding element relative to the spindle gage line. This telescoping motion is able to overcome the controlled low force on the servo motor and displace the encoder. The encoder displacement as measured from the tool "0" set point is processed by the machine CNC which decelerates in a predetermined distance to zero velocity. The distance traveled is the same as the travel of the telescoping tool holder when the compressable spring preloaded assembly is seated solidly in the adapter body but not compressed. When the predetermined transducer position is reached the machine CNC will offset the Z axis at this point and will immediately feed the drill or Z axis at a programmed feed rate to a programmed depth from the offset point which is the work surface. At the programmed depth, the spindle will retract to a point that brings the tool clear of the work surface if another hole is to be drilled or the spindle will retract to a tool change position if another tool is required.

If drill becomes dull or chips build up in the hole being drilled, the thrust required to continue feeding the drill will become excessive and cause the spring preloaded subassembly, which has been preset for the correct amount of thrust, to compress. This will permit the tool holder to telescope deeper in the adapter body displacing the tool actuating rod, spindle control rod, sliding element and transducer past the predetermined position, signaling the machine CNC that the thrust limit has been exceeded. As the drilling operation continues the amount of thrust will continue to increase causing the transducer further displacement. The amount of thrust causing this displacement is proportional to the rate of the spring in the pre-loaded assembly and can be determined by the amount of transducer displacement. This information is processed by the machine CNC which will reduce the spindle feed rate until the hard spot or other high thrust causing conditions has changed. The CNC will continually monitor the thrust. If the amount of thrust can not be controlled then the CNC will abort the drilling cycle. See FIG. 5.

If the drill breaks before the programmed depth is reached, the spring-loaded tool holder will unseat in the adapter body. This action will cause the tool actuating rod to move with the tool holder, in turn the low force on the linear servo motor will displace the spindle control rod causing the sliding element to move and the transducer to be displaced from its predetermined position, signaling the machine CNC that a malfunction has occurred.

In advanced CNC logic, the initial surface location position can be put in memory. This information can be used to determine if a drill was broken on a previous operation but went undetected. If the drill was broken, the surface location position of the new cycle would be different than that with a full length drill. This difference in position will signal the machine CNC that a malfunction has occurred.

If broken tool detection is not required, then this same logic and tool adapter action can be used to sense when a drill has broken through the workpiece thickness. This may be the case when using larger diameter drills for drilling through holes from irregular surfaces of large castings or weldments.

PROGRAMMABLE TORQUE SENSING

When drilling or milling with extremely small diameter tools it is very difficult to sense load conditions that indicate a pending tool failure because of dull tools, chip build up conditions or hard areas in the material being machined. Torque sensing by means of spindle drive motor current measurement can be used on larger tools. Other means such as acustical detection or vibration detection can be used for smaller tools under certain conditions and quite often these very complex and expensive instrumentation and electrical components cannot detect tool vibration or noises from certain other vibrations and noises being produced by the many moving parts related to all machining systems, particularly at high speeds and frequencies. These noise and vibration instruments do not actually measure the true load being applied to the tool, and therefore cannot respond to instantaneous cutting conditions. Most cutting tools are programmed to operate at torque levels below their torsional limit. Ideally, torque sensing system provides a signal that lies between the operating range and tool torsional limit to prevent tool failure. To overcome these operational and economic disadvantages, I have provided a very sensitive and electronically adjustable torque sensing tool adapter, consisting of an adapter body, a bearing mounted adapter spindle with a tool holding collet, supported in the adapter body, a spindle cam ring secured to the spindle, an actuating rod cam ring secured to an actuating rod linearly guided and radially supported in the adapter body by a ball spline bushing. A series of balls operating in vee grooves of the above cam ring transmit torque to the adapter spindle by means of the ball spline bushing being secured to the adapter body which has been inserted and clamped in the machine spindle. The amount of torque transmitted through the series of balls is controlled by the amount of thrust that is produced by the linear servo motor that applies the thrust to the tool actuating rod by means of the spindle control rod that is rotatably connected to the sliding element and actuated by the linear motor.

The machine CNC is programmed to vary the thrust produced by the linear motor proportional to the torque required to machine the part.

In operation the tool is inserted in the spindle and the tool presence, "0" set point, and type of tool sequences are executed as previously described. The machining cycle is then started using conventional tool, workpiece relationship methods. If during the machining operation the amount of torque required by the tool exceeds the torque level produced by the controlled thrust on the cam rings, the balls will attempt to ramp up the vee grooves forcing the actuating cam ring to displace the tool actuating rod which will displace the linear transducer secured to the sliding element. The transducer will produce an error signal and transmit it to the CNC. At this point the worn tool can be replaced or a chip clearing or a feed reduction sequence can be executed.

In another mode the machine CNC is programmed to close the servo position loop of the sliding element when the "0" set point has been made.

In operation the tool is inserted in the spindle and the tool presence, "0" set point, and type of tool sequences are executed as previously described. The machining cycle is then started using conventional tool, workpiece relationship methods. During the machining operation the amount of force required by the linear motor to maintain the "0" set position against the separation load on the tool actuating rod from the balls operating in the vee grooves is proportional to the amount of torque required by the tool. If the current needed to provide the required linear motor force exceeds a predetermined amount an excessive torque signal will be sent to the CNC control. If the current level drops drastically during machining a broken tool signal will be sent to the CNC control.

PRESETABLE TORQUE SENSING

Under certain conditions it may be advantageous to preset the torque limiting values of the tool adapter by mechanical means during a tool set-up procedure rather than controlling the torque by means of the thrust from the linear servo motor. Therefore, I have provided a torque limiting tool adapter consisting of an adapter body bearing mounted adapter spindle with a tool collet supported in the adapter body. A spindle cam ring secured to the the end of the tool actuating rod by the linear motor. If during the machining operation the amount of torque required by the tool exceeds the torque level produced by the sum of these thrust values acting on the actuating rod cam ring, the balls will attempt to ramp up the vee grooves forcing the actuating cam ring to displace the actuating rod which will displace the linear transducer secured to the sliding element. The transducer will produce an error signal and transmit it to the CNC. At this point a worn tool can be replaced or a chip clearing or a feed reduction sequence can be executed. Optionally, the machining operation can continue with a modified, by sufficient feed rate to maintain deflection of the spring. The encode position, hence the amount of spring deflection can continually be monitored and be compared via the CNC program with the rate of spring in the tool adapter, the actual torque level can then be determined. This permits continuous monitoring of the load on the tool. The CNC can be programmed to change the machine feed rate until the material hard spots or other conditions are corrected. If the loads should get excessive even after feed rate change then the machining cycle can be stopped. This feature also provides for a maximum rate of drill penetration, generally above the normal feed rate, until such time as the drill gets dull. Therefore higher productivity is realized. This is really a form of adaptive control. See FIGS. 8 and 10.

PRESETABLE TORQUE AND THRUST LIMITING ADAPTER

Quite often when drilling with extremely small diameter drills it is desirable to sense excessive thrust in addition to excessive torque. Therefore, I have provided a tool adapter capable of being preset to limit the thrust and torque being used during a drilling operation. The torque and thrust settings are exclusive of each other. The tool adapter consists of an adapter body, a bearing mounted adapter spindle with a collet, supported in a spindle sleeve slidably mounted and keyed in the adapter body.

A thrust limiting spring preloaded subassembly secured to the spindle sleeve and seated against an internal shoulder in the adapter body which comprises a spring guide body, a calibrated thrust spring, a sliding thrust collar and a fixed thrust collar which is preset for the desired limit of thrust. A spindle cam ring is secured to the spindle, an actuating rod cam ring secured to an actuating rod linearly guided and radially supported in the spindle sleeve by a ball spline bushing. A series of balls operating in vee grooves of the above cam rings transmit torque to the adapter spindle by means of the ball spline bushing being secured to the spindle sleeve, the sleeve being keyed to the adapter body which has been inserted and clamped in the machine spindle. The amount of torque being transmitted through the series of balls is controlled by the amount of thrust load applied by a thrust spring to a thrust collar against a shoulder of the actuating rod. A spring adjusting nut is threaded internally in the spindle sleeve and is adjusted to provide the proper thrust which results in the correct amount of torque for the tool being used.

In operation the tool is inserted in the spindle and the tool presence, "0" set point, and type of tool sequences are executed as previously described. The machine cycle is then started using conventional tool workpiece relationship methods. The torque value that can be applied to the tool during machining operation is determined by the sum of the thrust on the actuating rod established during the tool set-up procedure and the low level of thrust maintained on the end of the tool actuating rod by the linear motor. If during the drilling operation the amount of torque required by the tool exceeds the torque level produced by the sum of these thrust values acting on the cam ring, the balls will attempt to ramp up the vee grooves forcing the actuating cam ring to displace the actuating rod which will displace the linear transducer secured to the sliding element.

The thrust value that can be applied to the drill during the machining operation is determined by the sum of the thrust established by the thrust limit spring preloaded sub-assembly and the low level of thrust maintained on the actuating rod by the linear motor. If during the drilling operation the thrust required by the drill exceeds the thrust level produced by the sum of these thrust values acting on the spindle sleeve, the actuating rod will be displaced, which will displace the linear transducer secured to the sliding element.

The transducer will produce an error signal if either the thrust or torque limits are exceeded and transmit it to the CNC. At this point a worn drill can be replaced or a chip clearing or a feed reduction sequence can be executed. Optionally the machine operation can continue with a modified but sufficient feed rate to maintain deflection of either the thrust of torque control spring depending on which limit is being exceeded during the machining operation. The encoder position, hence the amount of spring deflection can continually be monitored and be compared via the CNC programs with the rate of spring in the tool adaptor. The actual torque or thrust level can then be determined. This permits continuous monitoring of the load on the tool. The CNC can be programmed to change the machine feed rate until the material hard spots or other conditions are corrected. If the loads should get excessive even after feed rate change then the machining cycle can be stopped. This feature also provides for a maximum rate of drill penetration, generally above the normal feed rate, until such time as the drill gets dull. Therefore higher productivity is realized. This is really a form of adaptive control. See FIGS. 9 and 10.

TORQUE LIMITING SURFACE SENSING ADAPTER

The torque limiting tool adapter can be configured to provide the surface sensing feature as described earlier. For this purpose I have provided a telescoping tool holder which consists of an adapter having an adapter body arranged to be retained in the taper of the machine spindle. A bearing mounted adapter spindle is provided with a collet supported in a spring loaded spindle sleeve slidably mounted and keyed in the adapter body and retained by a stop ring. A spindle cam ring is secured to the spindle, an actuating rod cam ring is secured to an actuating rod which is linearly guided and radially supported in the spindle sleeve by a ball spline bushing. A series of balls operating in vee grooves of the above cam rings transmit torque to the adapter spindle by means of the ball spline bushing being secured to the spindle sleeve. The spindle sleeve is driven by the key in the adapter body which has been inserted and clamped in the machine spindle. The spindle, an actuating rod cam is secured to an actuating rod which is linearly guided and radially supported in the adapter body by a ball spindle bushing. A series of balls operating in vee grooves of the above cam range transmit torque to the adapter spindle by means of the ball spline bushing being secured to the adapter body which has been inserted and clamped in the machine spindle The amount of torque transmitted through the series of balls is controlled by the amount of thrust load applied by a thrust spring to a thrust collar against a shoulder of the actuating rod. A spring adjusting nut is threaded internally in the adapter body and is adjusted to provide the proper thrust which results in the correct amount of torque for the tool bearing used.

In operation the tool is inserted in the spindle and the tool presence, "0" set point, and type of tool sequences are executed as previously described. The machining cycle is then started using conventional tool workpiece relationship methods. The torque value that can be applied to the tool during machining operations is determined by the sum of the thrust on the actuating rod established during the tool set-up procedure and the low level of thrust maintained on amount of torque transmitted through the series of balls is controlled by the amount of thrust load applied by a thrust spring to a thrust collar against a shoulder of the actuating rod.

A spring adjusting nut is threaded internally in the spindle sleeve and is adjusted to provide the proper thrust which results in the correct amount of torque for the tool being used.

In operation the tool is inserted in the spindle and the tool presence, "0" set point and type of tool sequences are executed as previously described. When the drilling operation starts, the spindle mounted tool adapter is moved to the work surface at a rapid traverse rate along the Z axis, until the drill contacts the work surface. At this point, the drill stops advancing but the spindle continues to move toward the work surface. This causes the spindle sleeve to telescope into the adapter body which in turn causes the tool actuating rod to move the spindle control rod and sliding element relative to the spindle. This telescoping motion is able to overcome the controlled low force on the servo motor and displaces the encoder. The encoder displacement as measured from the "0" set point is processed by the machine CNC which decelerates the Z axis in a predetermined distance to zero velocity. The distance traveled is the same as the travel of the telescoping tool holder seating it solidly in the adapter body. When the predetermined transducer position is reached, the machine CNC will offset the Z axis at this point and will immediately feed the drill or Z axis at a programmed feed rate to a programmed depth from the offset point which is the work surface. At the programmed depth the spindle will retract to a point that brings the tool clear of the work surface if another hole is to be drilled or the spindle will retract to a tool change position if another tool is required.

During a drilling operation, the torque value that can be applied to the drill is determined by the sum of the thrust on the actuating rod established during the tool set-up procedure and the low level of thrust maintained on the end of the tool actuating rod by the linear motor. If during the drilling operation, the amount of torque required by the tool exceeds the torque level produced by the sum of these values acting on the actuating rod cam ring, the balls will attempt to ramp up the vee grooves forcing the actuating cam ring to displace the actuating rod which will displace the linear encoder secured to the sliding element. The encoder will produce an error signal and transmit it to the CNC. At this point, a worn tool can be replaced or a chip clearing or a feed reduction sequence can be executed.

TORQUE AND THRUST LIMITING SURFACE SENSING ADAPTER

The torque and thrust limiting tool adapter can be configured to provide the surface sensing feature as described earlier. For this I have provided a telescoping tool holder which consists of an adapter having an adapter body arranged to be retained in the taper of the machine spindle. I provide a bearing mounted adapter spindle with a collet, supported in a spring loaded spindle sleeve slidably mounted and keyed in the adapter body and retained by a stop ring. A spindle cam ring is secured to the spindle, an actuater rod cam ring is secured to an actuating rod which is linearly guided and radially supported in the spindle sleeve by a ball spline bushing. A series of balls operating in vee grooves of the above cam ring transmit torque to the adapter spindle by means of the ball spline bushing being secured to the spindle sleeve. The spindle sleeve is driven by the key in the adapter body which has been inserted and clamped in the machine spindle. The amount of torque transmitted through the series of balls is controlled by the amount of thrust load applied by a thrust spring to a thrust collar against a shoulder of the actuating rod. A spring adjusting nut is threaded internally in the spindle sleeve and is adjusted to provide the proper thrust which results in the correct amount of torque for the tool being used.

A thrust limiting spring preloaded subassembly having a spring guide body, a calibrated thrust spring, a sliding thrust collar and a fixed thrust collar is preset for the desired limit of thrust, is secured to the spindle sleeve. It becomes seated against an internal shoulder in the adapter body after the surface sensing sequence has occurred.

In operation the tool is inserted in the spindle and the tool presence, "0" set point, and type of tool sequences are executed as previously described. When the drilling operation starts the spindle mounted tool adapter is moved to the work surface at a rapid traverse rate by the Z axis until the drill contacts the work surface. At this point, the drill stops advancing, but the spindle axies continues to move toward the work surface. This causes the spindle sleeve to telescope into the adapter body which in turn causes the tool actuating rod to move the spindle control rod and sliding element relative to the spindle. This telescoping motion is able to overcome the controlled low force on the servo motor and displace the encoder. The encoder displacement as measured from the "0" set point is processed by the machine CNC which decelerates the Z axis in a predetermined distance to zero velocity. The distance traveled is the same as the travel of the telescoping tool holder.

When the predetermined transducer position is reached, the machine CNC will offset the Z axis at this point and will immediately feed the drill or Z axis at a programmed feed rate to a programmed depth from the offset point which is the work surface. At the programmed depth the spindle will retract to a point that brings the tool clear of the work surface if another hole is to be drilled or the spindle will retract to a tool change position if another tool is required.

During a drilling operation, the torque value that can be applied to the drill is determined by the sum of the thrust on the actuating rod established during the tool set-up procedure and the low level of thrust maintained on the end of the tool actuating rod by the linear motor. If during the drilling operation, the amount of torque required by the tool exceeds the torque level produced by the sum of their values acting on the actuating rod cam ring, the balls will attempt to ramp up the vee grooves forcing the actuating cam ring to displace the actuating rod which will displace the linear encoder secured to the sliding element.

The thrust value that can be applied to the drill during the drilling is determined by the sum of the thrust established by the thrust limiting spring preloaded sub-assembly, the low level of thrust maintained on the actuating rod by the linear motor and the low compression rate of the spring load against the sliding spindle sleeve. If during the drilling operation the thrust required by the drill exceeds the thrust level produced by the sum of these thrust values acting on the spindle sleeve, the actuating rod will be displaced, which will displace the linear transducer secured to the sliding element.

The transducer will produce an error signal if either the thrust or torque limits are exceeded and transmit it to the CNC. At this point, a worn drill can be replaced or a chip clearing, or speed reduction sequence can be executed.

In the drawings, the same reference numerals are used throughout the several views and refer to the same parts, and the sectional views are taken looking in the direction of the arrows at the ends of the section lines.

Referring now to the drawings, I show in:

FIG. 1 a side elevation of a machining center with a typical device of my invention inserted in the spindle;

FIG. 12 is a mechanical schematic of my invention also taken along line 3—3 of FIG. 1 similar to FIG. 3;

FIG. 13 is an electro-mechanical schematic of my invention taken along line 13—13 of FIG. 12.

Figure 1:
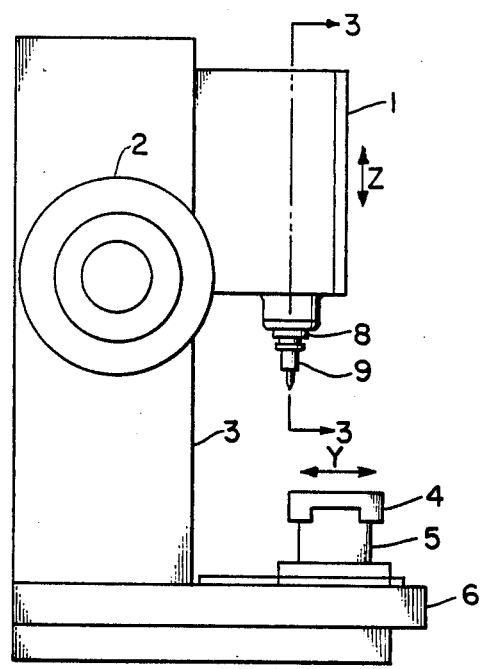
Figure 2:
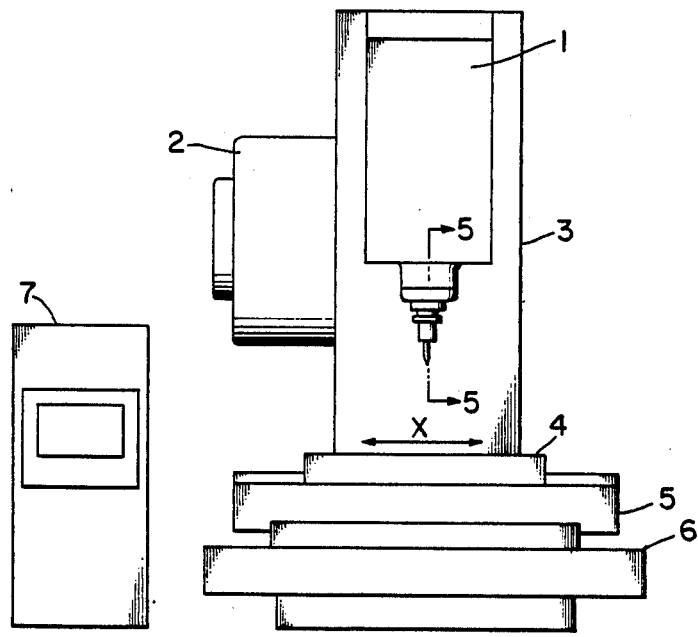
FIG. 2 is a front elevation of a machining center.

Referring to the drawings I show in FIGS. 1 and 2 a vertical spindle machining center having a base 6 supporting a moving saddle 5. The saddle motion is referred to as the Y axis. The saddle supports the work-holding table 4. The table motion is referred to as the X axis. The base 6 also supports the machine column 3. Mounted to column 3 is the automatic tool changer 2. Column 3 also provides a slidable mounting surface for the spindle headstock 1. The vertical motion of the headstock 1 is referred to as the Z axis. Computer numerical control 7, controls all functions of the machining center.

Figure 3:
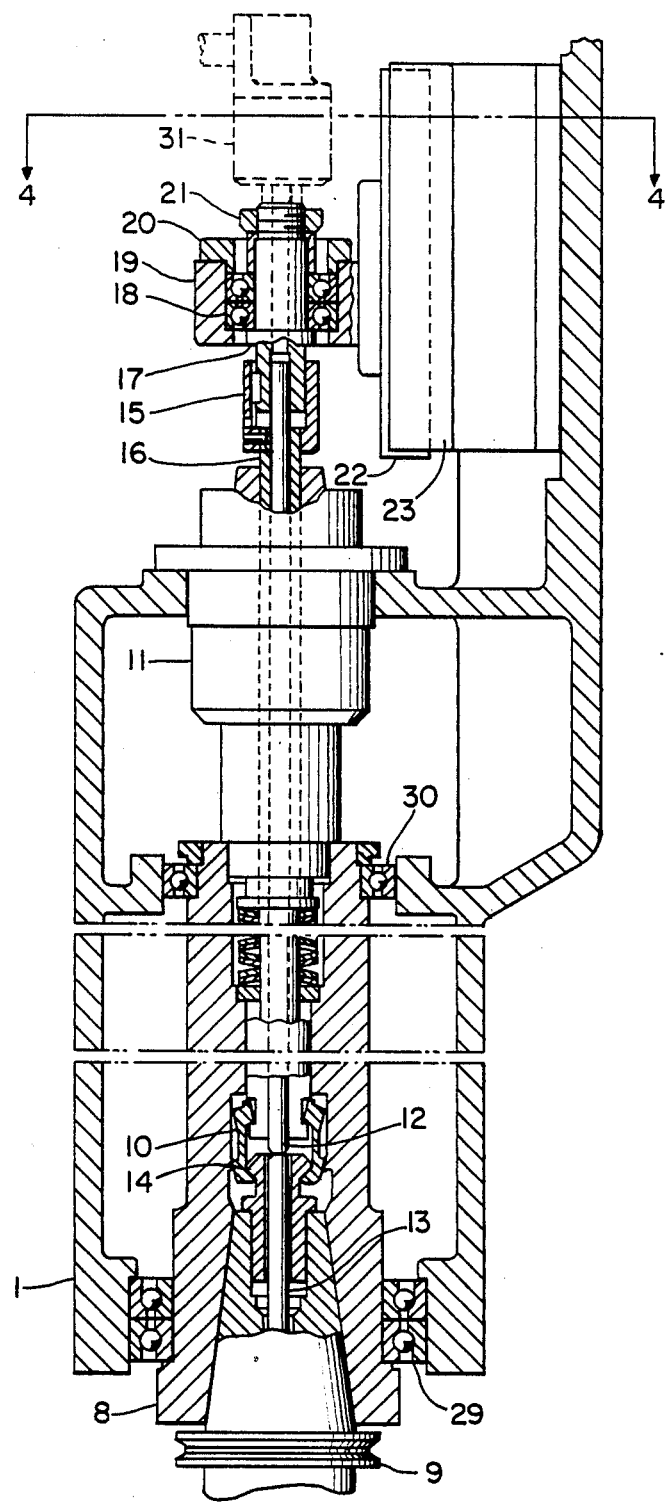
FIG. 3 is a section of the spindle of a machining center taken along the line 3—3 of FIG. 1.

Referring to FIG. 3 I show a section through the spindle of a typical machining center. Operating through the center of the spindle I show a spindle control rod 12 secured to rotating connecting shaft 17 supported in housing 19 and bearing 18. Bearing cap 20 clamps outer race of bearing 18 in housing 19, jam nut 21 clamps inner races of bearing 18 to connecting shaft 17. Spindle control rod 12 passes through a typical power tool lock mechanism indicated in part by retention collet 10 and operating mechanism 11. Tool lock center shaft 16 is secured to telescoping coupling 15 which allows axial motion to occur between the spindle control road 12 and center shaft 16 but allows center shaft 16 to rotatably drive connecting shaft 17.

Figure 4:
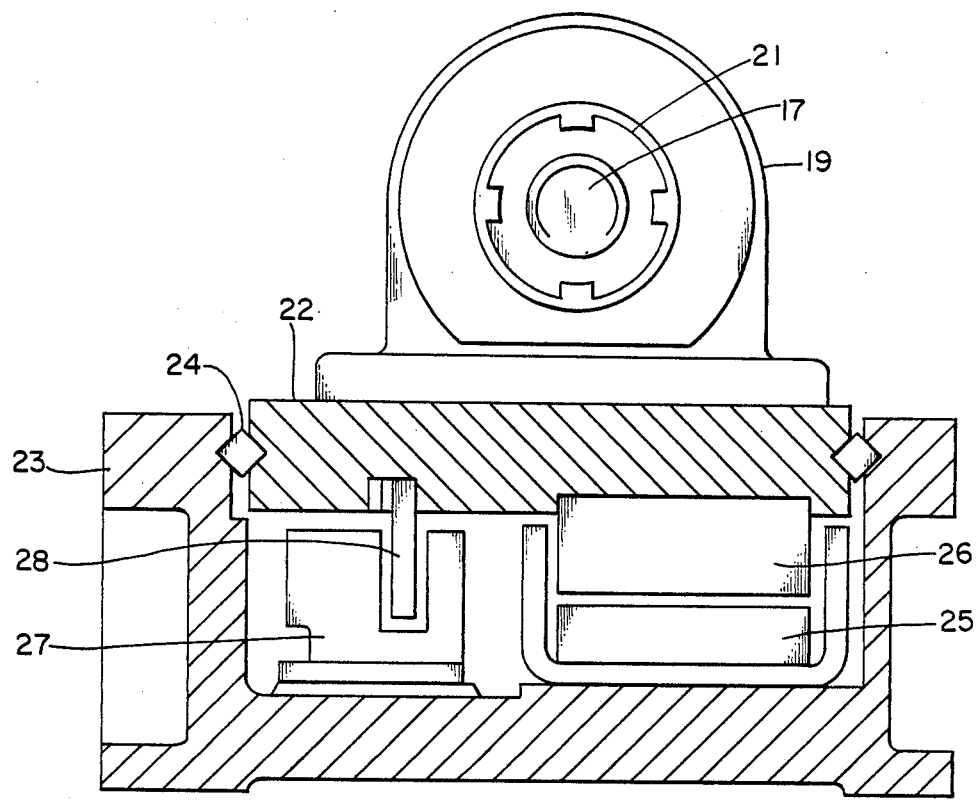
FIG. 4 is a section of the transducer unit taken along the line 4—4 of FIG. 3.

A typical tooling device 9 is supported in taper of spindle 8 and retained by knob 14 by means of power tool lock retention collet 10. Tool actuating rod 13 is in contact with spindle control rod 12. Referring to FIG. 4 I show housing 19 secured to sliding element 22 which controls the position of and force on control rod 12 (FIG. 3) by linear servo motor (25, 26) and transducer (27, 28) under the control of computer numerical control 7 (FIG. 2). Sliding element 22 is supported and guided on base 23 by preloaded antifriction bearing 24. If coolant through the tool is a requirement then connecting shaft 17 is modified to mount a rotary coolant coupling 31, spindle control rod 12 is also changed to a hollow tube to permit coolant flow into tool lock collet area occupied by retention collet 10.

SURFACE SENSING, THRUST SENSING ADAPTER

Figure 5:
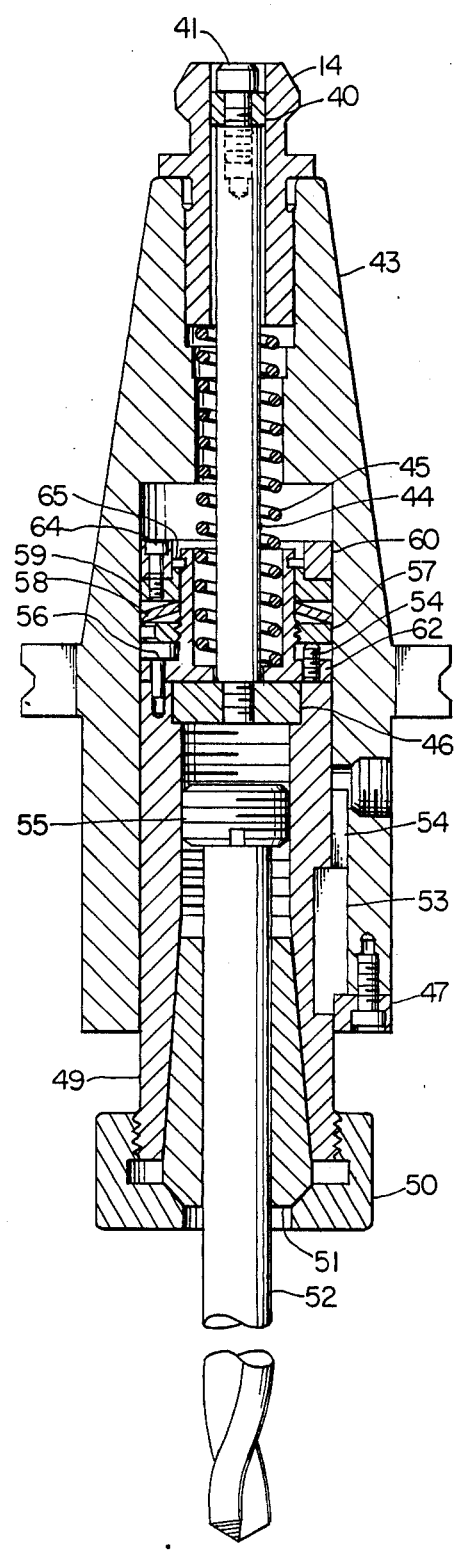
FIG. 5 is a section of the tool adapter portion of my invention arranged for surface sensing and excessive thrust detection taken along 5—5 of FIG. 2.

Referring now to FIG. 5 I show a section through a telescoping tool adapter 9 arranged for surface sense drilling and presetable thrust sensing. The adapter comprises an adapter body 43 and retention knob 14. Slidably supported in body 43 is tool holder 49 driven by key 53 and retained by stop block 47 against pressure from spring 45. Tool actuating rod 44 is secured to tool holder 49 by tool holder plug 46, spring 45 is seated against spring guide body 62 which is assembled to thrust adjusting nut 57, calibrated thrust spring 58, inner sliding thrust collar 59 and outer thrust collar 60. Presetable thrust load from spring 58 is contained by snap ring 65. A drill 52 is clamped in collet 51 by collet lock nut unit 50. Fitting spacer 40 is secured to actuating rod 44 by spaced screw 41.

Before telescoping tool adapter 9 is inserted in spindle 8 control rod 12 (FIG. 3) is fully retracted by linear motor (25, 26) FIG. 4. After insertion, linear motor (25, 26) advances control rod 12 with a reduced current or low force until control rod 12 contacts spacer screw 41 of actuating rod 44. Position of transducer (27, 28) is processed by computer numerical control 7 to establish a "0" set point and to verify tool presence and type of tool. The type of tool is determined by the relationship of spacer screw 41 to the gage line of the taper of adapter 43. "0" setting eliminates any inaccuracies due to thermal growth of spindle assembly components relative to the length of spindle control rod 12.

During surface sensing drilling operation, the spindle 8 is advanced toward the workpiece until drill 52 contacts the work surface. The spindle or Z axis will continue to advance, which will cause the tool holder 49 to telescope into adapter body 43 compressing spring 45. This motion will also cause tool actuating rod 44 to displace spindle control rod 12 and sliding element 22 (FIG. 3). Sliding element 22 will displace transducer (27, 28) FIG. 4. The transducer displacement will cause computer control 7 (FIGS. 2 and 13) to decelerate the Z axis to zero velocity in the distance it takes outer thrust collar 60 to seat solidly in tool adapter body 43. At this point, the Z axis position is set to zero and will feed the drill 52 into the work to a depth measured from the work surface by the computer numerical control 7.

If the drill should break before the depth is reached, spring 45 will cause tool holder 45 to unseat in adapter body 43, thereby allowing spindle control rod 12 and transducer (27, 28) to be displaced. This motion will cause transducer (27, 28) to send an error signal to the computer numerical control which will stop the cycle until the problem is corrected.

If drill thrust exceeds the preset thrust load due to dull tool chip build up or hard spots then the thrust spring 58 will deflect allowing tool holder 45 to telescope further into adapter body 43 thereby causing spindle control rod 12 and transducer (27, 28) to be displaced. This motion will cause transducer (27, 28) to signal the computer numerical control that preset thrust has been reached allowing computer numerical control 7 to monitor amount of spring deflection which determines actual thrust and to control feed rate and machining cycle duration.

PROGRAMMABLE TORQUE SENSING

Figure 6:
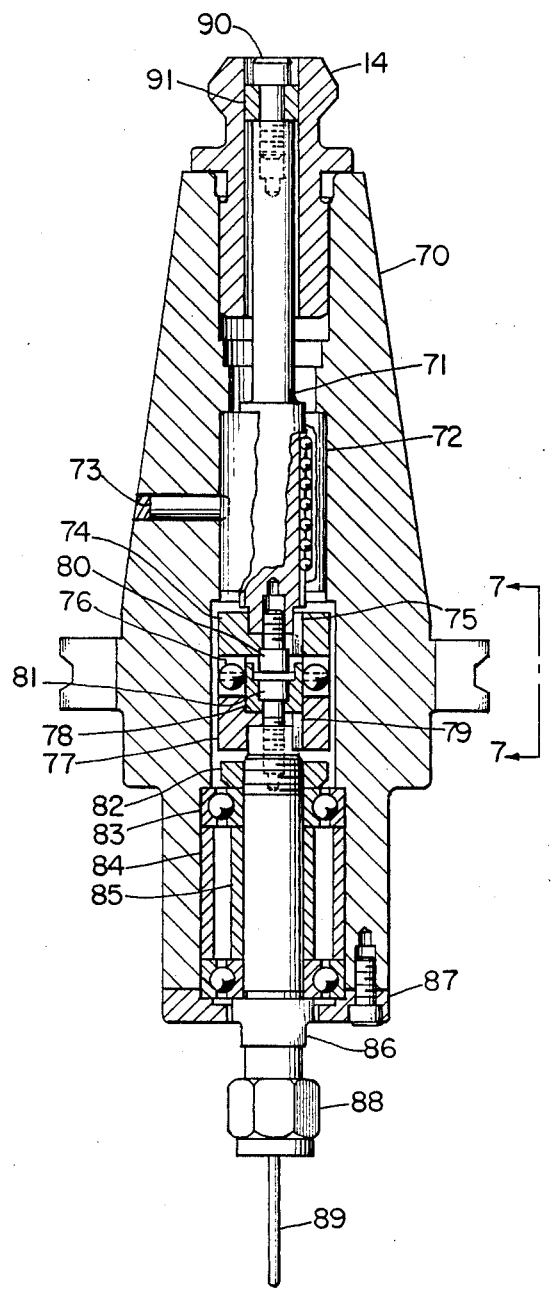
FIG. 6 is a section of the tool adapter portion of my invention arranged for programmable excessive torque detection also taken along 5—5 of FIG. 2.

I now refer to FIG. 6 showing a section through a programmable torque sensing adapter which consist of adapter body 70 and retention knob 14. Adapter spindle 86 with collet 88 is mounted in adapter body 70 by means of bearings 83 located by inner spacer 85 and out spacer 84 and locked in place by jam nut 82 and retained in adapter body 70 by bearing cap 87. Spindle cam ring 77 is keyed to spindle 86 by pin 79 and clamped to spindle 86 by ball locating bushing 78 and screw 81. Actuating rod cam ring 74 is keyed to actuating rod 71 by pin 75 and clamped to actuating rod 71 by screw 80. Actuating rod 71 has integral precision splines that operate with ball spline bushing 72 which is secured in adapter body 70 by pin 73. Ball spline bushing 72 radially supports actuating rod 71 and also provides the means to transmit torque between adapter body 70 and actuating rod 71 while permitting actuating rod 71 to have free linear motion. Fitting spacer 91 is secured to actuating rod 71 by means of screw 90. Balls 76 operate in vee groove 93 of spindle cam ring 77 and vee groove 92 of actuating cam ring 74 (FIG. 7).

Before programmable torque sensing adapter is inserted in spindle 8, control rod 12 (FIG. 3) is fully retracted by linear motor (25, 26) FIG. 4. After insertion, linear motor (25, 26) advances control rod 12 with a reduced current or low force until control rod 12 contacts spacer screw 90 of actuating rod 71. Position of transducer (27, 28) is processed by computer numerical control 7 to establish a "0" set point and to verify tool presence and type of tool. The type of tool is determined by the relationship of spacer screw 90 to the gage line of the taper of adapter body 70. "0" setting eliminates any inaccuracies due to thermal growth of spindle assembly components relative to length of spindle control rod 12. The current on linear motor (25, 26) is increased to programmed amount necessary to provide the correct amount of thrust against actuating rod 71. This thrust is transmitted to actuating rod cam ring 74, balls 76 and spindle cam ring 77.

The amount of torque that can be transmitted from actuating rod 71 through actuating rod cam ring 74, balls 76, spindle cam ring 77 to spindle 86 is proportional to the amount of thrust acting on actuating rod 71 from linear motor (25, 26).

Figure 7:
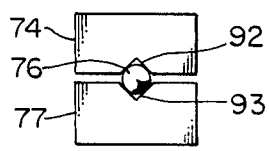
FIG. 7 is a view of a ball cam portion of my invention taken along line 7—7 of FIG. 6.

When tool 89 which is clamped in spindle collet 88 requires more torque than programmed then balls 76 will cause actuating rod cam ring 74 to be axially displaced by balls 76 operating in vee grooves 92 & 93 FIG. 7. This displacement will also displace tool actuater rod 71, spindle control rod 12 and transducer (27, 28). This motion will cause transducer (27, 28) to send an error signal to the computer numerical control which will either retract the tool to clear chips, reduce feed to reduce the necessary torque or exchange the tool with a new one.

PRESETABLE TORQUE SENSING ADAPTER

Figure 8:
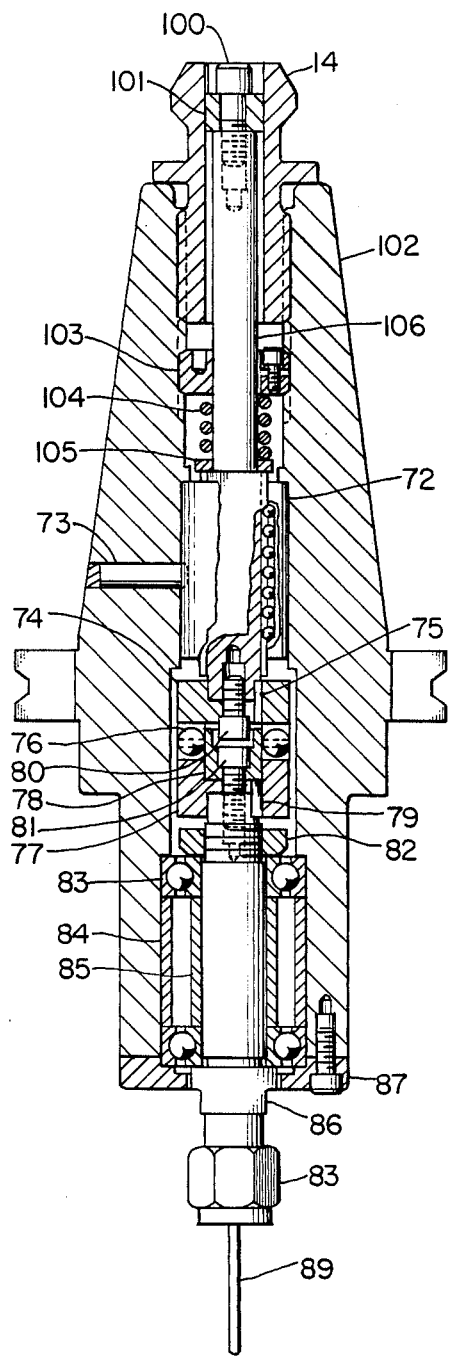
FIG. 8 is a section of a tool adapter portion of my invention arranged for presetting a value for excessive torque detection taken along 5—5 of FIG. 2.

I now refer to FIG. 8, showing a section through a presetable torque sensing adapter which consists of adapter body 102 and retention knob 14. Adapter spindle 86 with collet 88 is mounted in adapter body 102 by means of bearings 83 located by inner spacer 85 and outer spacer 84 and locked in place by jam nut 82 and retained in adapter body 70 by bearing cap 87. Spindle cam ring 77 is keyed to spindle 86 by pin 79 and clamped to spindle 86 by ball locating bushing 78 and screw 81. Actuating rod cam ring 74 is keyed to actuating rod 106 by pin 75 and clamped to actuating rod 71 by screw 80. Actuating rod 106 has integral precision splines that operate with ball spline bushing 72 which is secured in adapter body 102 by pin 73. Ball spline bushing 72 radially supports actuating rod 106 and also provides the means to transmit torque between adapter body 102 and actuating rod 106 while permitting actuating rod 106 to have free linear motion. Fitting spacer 101 is secured to actuating rod 106 by means of screw 100. Balls 76 operate in vee groove 93 of spindle cam ring 77 and vee groove 92 of actuating cam ring 74. Thrust from spring 104 is applied to actuating rod 106 by thrust collar 105. The spring pressure is controlled by adjusting nut 103 threaded to adapter body 102.

Before presetable torque sensing adapter is inserted in spindle 8 control rod 12 (FIG. 3) is fully retracted by linear motor 25, 26 (FIG. 4). After insertion, linear motor 25, 26 advances control rod 12 with a reduced current or low force until control rod 12 contacts spacer screw 100 of actuating rod 106 Position of transducer 27, 28 is processed by computer numerical control 7 to establish a "0" set point and to verify tool presence and type of tool. The type of tool is determined by the relationship of spacer screw 100 to the gage line of the taper of adapter body 102. "0" setting eliminates any inaccuracies due to thermal growth of spindle assembly components relative to length of spindle control rod 12. The pressure from spring 104 is transmitted from actuating rod 106 to actuating rod cam ring 74, balls 76 and spindle cam ring 77. The amount of torque that can be transmitted from actuating rod 106 through actuating rod cam ring 74, balls 74, spindle cam ring 77 to spindle 86 is proportional to the amount of spring pressure acting on actuating rod 106.

When tool 89, which is clamped in spindle collet 88, requires more torque than established by pressure from spring 104, then ball 76 will cause actuating rod cam ring 74 to be axially displaced by balls 76 operating in vee grooves 92 and 93. This displacement will also displace tool actuating rod 106, spindle control rod 12 and transducer 27, 28. This motion will cause transducer 27, 28 to signal the computer numerical control, that preset torque has been reached allowing computer numerical control 7 to monitor amount of spring deflection which determines actual torque and to control feed rate and machine cycle duration.

PRESETABLE TORQUE AND THRUST SENSING

Figure 9:
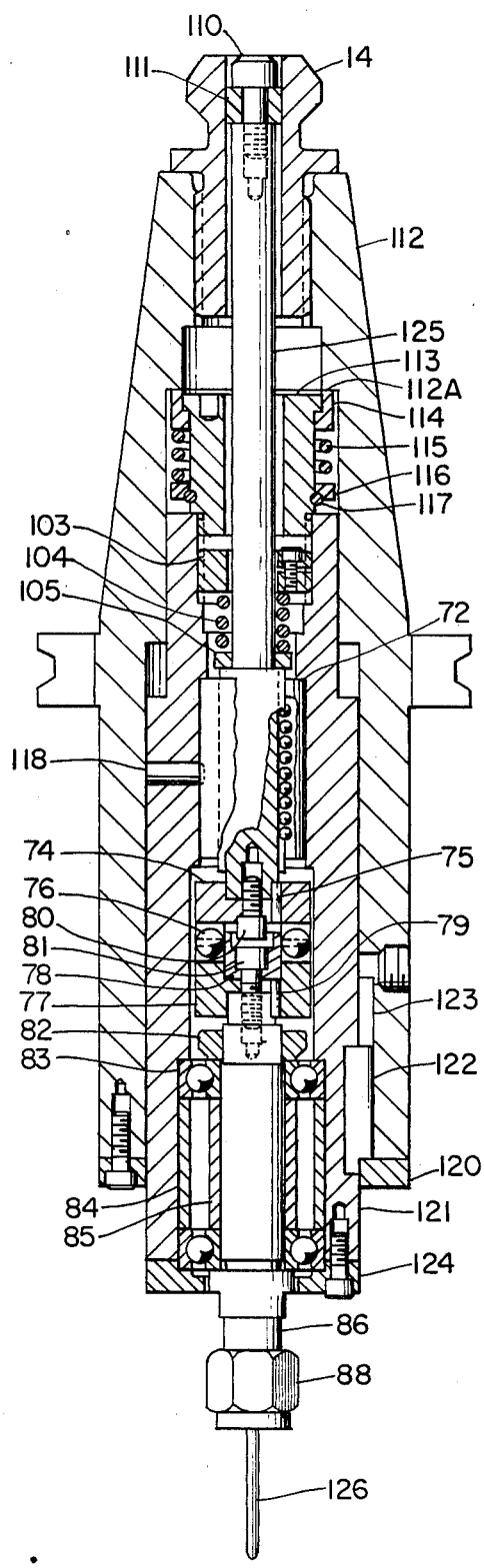
FIG. 9 is a section of a tool adapter portion of my invention arranged for presetting separate values for excessive torque and excessive thrust detection taken along 5—5 of FIG. 2.

Referring to FIG. 9 I show a section through a presetable torque and thrust sensing adapter which consists of adapter body 112 and retention knob 14. Adapter spindle 86 with collet 88 is mounted in spindle sleeve 121 by means of bearings 83 located by inner spacer 85 and outer spacer 84 and locked in place by jam nut 82 and retained in spindle sleeve 121 by bearing cap 124. Spindle cam ring 77 is keyed to spindle 86 by pin 79 and clamped to spindle 86 by ball locating bushing 78 and screw 81. Actuating rod cam ring 74 is keyed to actuating rod 125 by pin 75 and clamped to actuating rod 125 by screw 80. Actuating rod 125 has integral precision splines that operate with ball spline bushing 72 which is secured to spindle sleeve 121 by pin 118. Ball spline bushing 72 radially supports actuating rod 125 and also provides the means to transmit torque between spindle sleeve 121 and actuating rod 125 while permitting actuating rod 125 to have free linear motion. Balls 76 operate in vee groove 93 of spindle cam ring 77 and vee groove 92 of actuating rod cam ring 74. Spindle sleeve 121 is slidably mounted in adapter body 112, driven by key 122 and retained by cap 120. Pressure from torque control spring 104 is applied to actuating rod 125 by pressure collar 105. The spring pressure is controlled by adjusting nut 103 threaded to spindle sleeve 121. Thrust spring body 113 is secured to spindle sleeve 121 and supports sliding thrust collar 114 calibrated thrust spring 115, fitting collar 116 and snap ring 117. Sliding thrust collar 116 is seated against shoulder 112a in adapter body 112. Fitting spacer 111 is secured to actuating rod 125 by screw 110.

Before presetable torque and thrust sensing adapter is inserted in spindle 8, control rod 12 (FIG. 3) is fully retracted by linear motor 25, 26 (FIG. 4). After insertion, linear motor 25, 26 advances control rod 12 with a reduced current or low force until control rod 12 contacts spacer screw 110 of actuating rod 125. Position of transducer 27, 28 is processed by computer numerical control 7 to establish a "0" set point and to verify tool presence and type of tool. The type of tool is determined by the relationship of spacer screw 110 to the gage line of the taper of adapter body 112. The "0" setting eliminates any inaccuracies due to thermal growth of spindle assembly components relative to length of spindle control rod 12.

The pressure from spring 104 is transmitted from actuating rod 125 to actuating rod cam ring 74, balls 76 and spindle cam ring 77. The amount of torque that can be transmitted from actuating rod 125 through actuating rod cam ring 74, balls 74, spindle cam ring 77 to spindle 86 is proportional to the amount of spring pressure acting on actuating rod 106.

Figure 11:
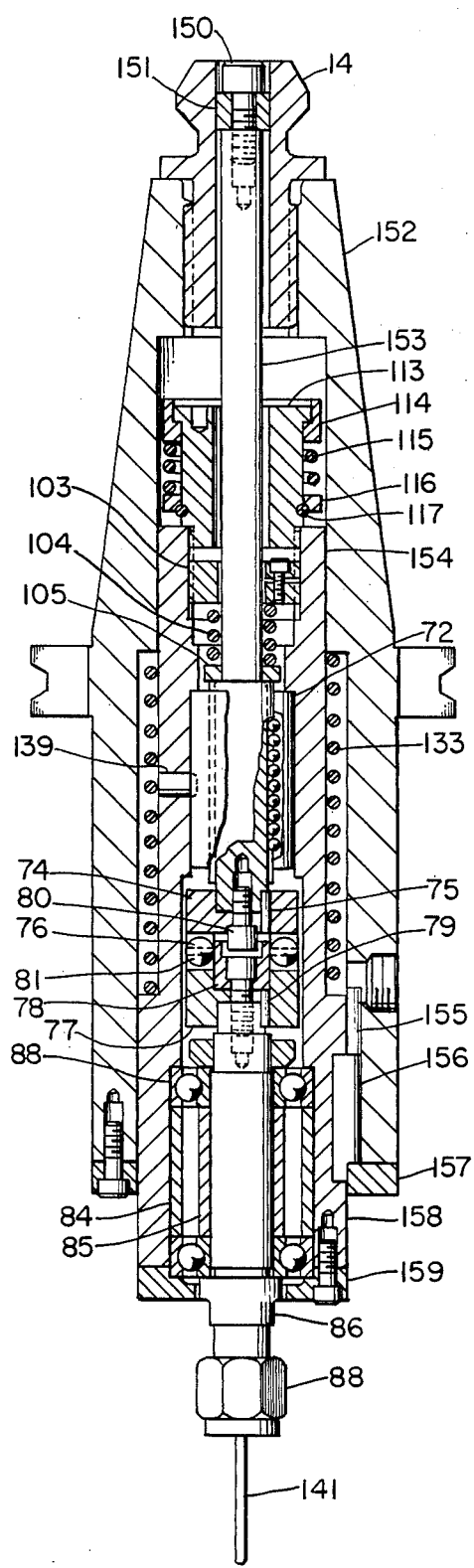
FIG. 11 is a section of a tool adapter portion of my invention arranged for surface sensing and for presetting separate values for excessive torque and excessive thrust detection taken along 5—5 of FIG. 2.

When tool 126 which is clamped in spindle collet 88 requires more torque than established by pressure from spring 104, then balls 76 will cause actuating rod cam ring 74 to be axially displaced by balls 76 operating in vee groove 92 and 93, (FIG. 11). This displacement will also displace tool actuating rod 125, spindle control rod 12 and transducer 27, 28. This motion will cause transducer 27, 28 to signal the computer numerical control 7 that preset torque has been reached.

If tool 126 requires more thrust than the amount determined by the setting of calibrated thrust spring 115, slidably mounted spindle sleeve 121 will telescope into adapter body 112. This relative linear displacement between spindle sleeve 121 and adapter body 112 will displace actuating rod 125, spindle control rod 12 and transducer 27, 28. This motion will cause transducer 27, 28 to signal the computer numerical control 7 that preset thrust has been reached. Therefore, if either the preset torque or preset thrust values is exceeded the above signals will allow the computer numerical control 7 to monitor the amount of spring deflection which determines actual torque or thrust and to control feed rate and machine cycle duration.

SURFACE SENSING, PRESETABLE TORQUE SENSING ADAPTER

Figure 10:
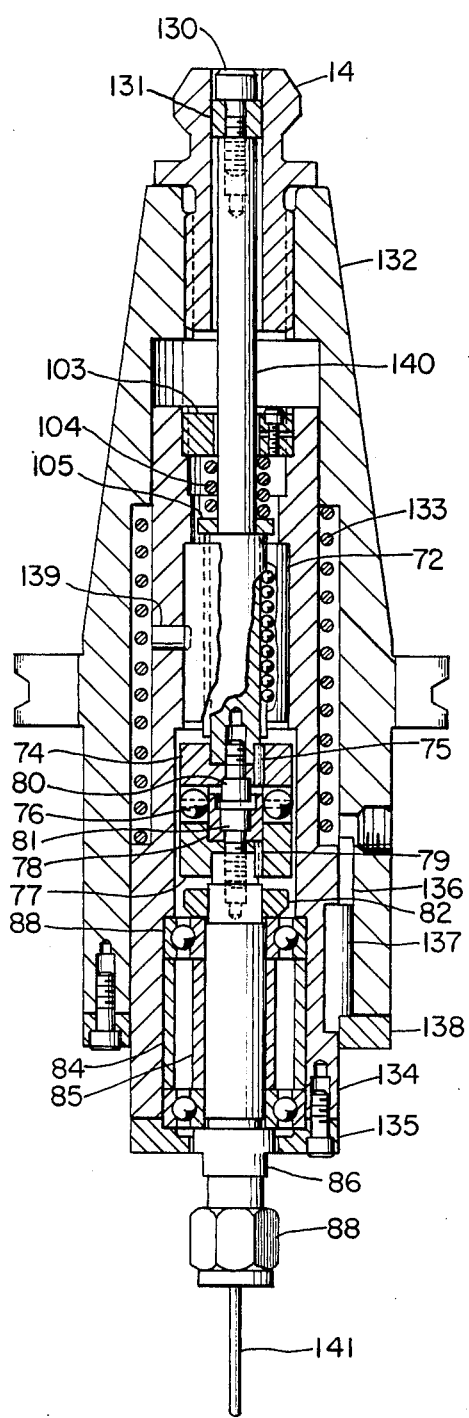
FIG. 10 is a section of a tool adapter portion of my invention arranged for surface sensing and for presetting a value of excessive torque taken along 5—5 of FIG. 2.

Referring now to FIG. 10, I show a section through a telescoping tool adapter arranged for surface sense drilling and presetable torque sensing. The adapter comprises an adapter body 132 and retention knob 14. Adapter spindle 86 with collet 88 is mounted in spindle sleeve 134 by means of bearings 83 located by inner spacer 85 and outer spacer 84 and locked in place by jam nut 82 and retained in spindle sleeve 134 by bearing cap 135. Spindle cam ring 77 is keyed to spindle 86 by pin 79 and clamped to spindle 86 by ball locating bushing 78 and screw 81. Actuating rod cam ring 74 is keyed to actuating rod 140 by pin 75 and clamped to actuating rod 140 by screw 80. Actuating rod 140 has integral precision splines that operate with ball spline bushing 72 which is secured to spindle sleeve 134 by pin 139. Ball spline bushing 72 radially supports actuating rod 140 and also provides the means to transmit torque between spindle sleeve 134 and actuating rod 140 while permitting actuating rod 140 to have free linear motion. Balls 76 operate in vee groove 93 of spindle cam ring 77 and vee groove 92 of actuating rod cam ring 74. Spindle sleeve 134 is slidably mounted in adapter body 132, driven by key 137 and retained by cap 138 against pressure from spring 133. Pressure from torque control spring 104 is applied to actuating rod 140 by pressure collar 105. The spring pressure is controlled by adjusting nut 103 threaded in spindle sleeve 134.

Fitting spacer 131 is secured to actuating rod 140 by screw 130.

Before surface sensing, the torque sensing adapter is inserted in spindle 8, control rod 12, (FIG. 3) is fully retracted by linear motor 25, 26 (FIG. 4). After insertion, linear motor 25, 26 advances control rod 12 with a reduced current or low force until control rod 12 contacts spacer screw 130 of actuating rod 140. The position of transducer (27, 28) is processed by computer numerical control 7 to establish a "0" set point and to verify tool presence and type of tool. The type of tool is determined by the relationship of spacer screw 130 to the gage line of the taper of adapter body 132. "0" setting eliminates any inaccuracies due to thermal growth of spindle assembly components relative to length of spindle control rod 12.

During surface sensing drilling operation, the spindle 8 is advanced toward the workpiece until drill 141 contacts the work surface. The spindle or Z axis will continue to advance, which will cause the spindle sleeve 134 to telescope into adapter body 132 compressing spring 133. This motion will also cause tool actuating rod 140 to displace spindle control rod 12 and sliding element 22 (FIG. 3). Sliding element 22 will displace transducer 27, 28 (FIG. 4). The transducer displacement will cause computer numerical control 7 (FIGS. 2 and 13) to decelerate the Z axis to zero velocity in the distance it takes to seat solidly in tool adapter body 132. At this point, the Z axis position is set to zero and will feed the drill 52 into the work to a depth measured from the work surface by the computer numerical control 7.

If the drill should break before the depth is reached, spring 133 will cause spindle sleeve to unseat in adapter body 132, thereby allowing spindle control rod 12 and transducer 27, 28 to be displaced. This motion will cause transducer 27, 28 to send an error signal to the computer numerical control 7 which will stop the cycle until the problem is corrected.

When tool 141 which is clamped in spindle collet 88 requires more torque than established by pressure from spring 104 then balls 76 will cause actuating rod cam ring 74 to be axially displaced by balls 76 operating in vee grooves 92 and 93. This displacement will also displace tool actuating rod 140, spindle control rod 12 and transducer 27, 28. This motion will cause transducer 27, 28 signal the computer numerical control 7 that preset torque has been reached, allowing computer numerical control 7 to monitor amount of spring deflection which determines actual torque and to control feed rate and machine cycle duration.

SURFACE SENSING, PRESETABLE TORQUE AND THRUST SENSING ADAPTER

Referring now to FIG. 11, I show a section through a telescoping tool adapter arranged for surface sense drilling and presetable torque and thrust sensing. The adapter comprises an adapter body 152 and retention knob 14. Adapter spindle 86 with collet 88 is mounted in spindle sleeve 158 by means of bearings 83 located by inner spacer 85 and outer spacer 84 and locked in place by jam nut 82 and retained in spindle sleeve 158 by bearing cap 159. Spindle cam ring 77 is keyed to spindle 86 by pin 79 and clamped to spindle 86 by ball locating bushing 78 and screw 81. Actuating rod cam ring 74 is keyed to actuating rod 153 by pin 75 and clamped to actuating rod 153 by screw 80. Actuating rod 153 has integral precision splines that operate with ball spline bushing 72 which is secured in spindle sleeve 158 by pin 159. Ball spline bushing 72 radially supports actuating rod 153 and also provides the means to transmit torque between spindle sleeve 158 and actuating rod 153 while permitting actuating rod 153 to have free linear motion. Balls 76 operate in vee groove 93 of spindle cam ring 77 and vee groove 92 of actuating rod cam ring 74. Spindle sleeve 158 is slidably mounted in adapter bodies 152, driven by key 156 and retained by cap 157 against pressure from spring 133. Pressure from torque control spring 104 is applied to actuating rod 153 by pressure collar 105. The spring pressure is controlled by adjusting nut 103 threaded to spindle sleeve 158. Thrust spring body 113 is secured to spindle sleeve 158 and supports sliding thrust collar 114 calibrated thrust spring 115, fitting collar 116 and snap ring 117. Fitting spacer 151 is secured to actuating rod 153 by screw 150.

Before surface sensing torque and thrust sensing adapter is inserted in spindle 8 control rod 12, FIG. 3 is fully retracted by linear motor 25, 26 (FIG. 4). After insertion, linear motor 25, 26 advances control rod 12 with a reduced current or low force until control rod 12 contacts spacer screw 150 of actuating rod 153. The position of transducer 27, 28 is processed by computer numerical control 7 to establish a "0" set point and to verify tool presence and type of tool. The type of tool is determined by the relationship of spacer screw 150 to the gage line of the taper of adapter body 152. "0" setting eliminates any inaccuracies due to thermal growth of spindle assembly components relative to length of spindle control rod 12.

During surface sensing drilling operation, the spindle 8 is advanced toward the workpiece until drill 141 contacts the work surface. The spindle or Z axis will continue to advance, which will cause the spindle sleeve 158 to telescope into adapter body 159 compressing spring 133. This motion will also cause tool actuating rod 153 to displace spindle control rod 12 and sliding element 22, FIG. 3. Sliding element 22 will displace transducer 27, 28 FIG. 4. The transducer displacement will cause computer numerical control 7 (FIGS. 2 and 13) to decelerate the Z axis to zero velocity in the distance it takes sliding thrust collar 114 to seat solidly in tool adapter body 43. At this point, the Z axis position is set to zero and will feed the drill 52 into the work to a depth measured from the work surface by the computer numerical control 7.

If the drill should break before the depth is reached, spring 133 will cause spindle sleeve 158 to unseat in adapter body 43, thereby allowing spindle control rod 12 and transducer 27, 28 to be displaced. This motion will cause transducer 27, 28 to send an error signal to the computer numerical control 7 which will stop the cycle until the problem is corrected.

When tool 141 which is clamped in spindle collet 88 requires more torque than established by pressure from spring 104 then balls 76 will cause actuating rod cam ring 74 to be axially displaced by balls 76 operating in vee groove 92 and 93, FIG. 15. This displacement will also displace tool actuating rod 153, spindle control rod 12 and transducer 27, 28. This motion will cause transducer 27, 28 to signal the computer numerical control 7 that preset torque has been reached.

If tool 141 requires more thrust than the amount determined by the setting of calibrated thrust spring 115, slidably mounted spindle sleeve 158 will telescope an additional amount into adapter body 152. This relative linear displacement between spindle sleeve 158 and adapter body 152 will displace actuating rod 153, spindle control rod 12 and transducer 27, 28. This motion will cause transducer 27, 28 to signal the computer numerical control 7 that preset thrust has been reached. Therefore, if either the preset torque value or the preset thrust value is reached, the above signals will allow the computer numerical control 7 to monitor the amount of spring deflection which determines the actual torque or thrust and to control feed rate and machine cycle duration.

Referring now to FIGS. 12 and 13, I show a mechanical schematic comprising headstock 1 with spindle 8 arranged to retain taper 285 of typical tooling device 9 having a tool actuating rod 13. Spindle control rod 12 is rotably connected to sliding element 22 by bearings in housing 19. Sliding element 22 is slidably supported in base 23. Fixed to base 23 is encoder or transducer 27 which works in conjunction with sliding scale 28 mounted to sliding element 22 to provide position location information of sliding element 22 to CNC control 7. Also fixed to base 23 is coil assembly 25 of linear servo motor which works in conjunction with permanent magnet assembly 26 fastened to sliding element 22. Computer numerical control 7 determines the direction and amount of force generated by linear servo motor 25, 26. The force on linear motor 25, 26 can be controlled to low levels for use in the tool verification and presence cycle, set zero sequence, surface sensing with tool adapters, and presetable torque and thrust sensing adapters. Higher forces from linear motor (25, 26) are applied for programmable torque sensing adapters. The linear transducer 27, 28 tracks sliding element location on all low force application and communicates position of sliding element 22 for all these applications to computer numerical control 7. Linear transducer 27, 28 also provides feedback information to computer numerical control 7 during closed loop operation. Limit switches 290 are used for safety overtravel purposes.

The detail function of the above elements are described in the prior description of thrust and torque sensing adapter.

Having thus described my inventions, what I claim as new and useful and desire to secure by United States Letters Patent is:

1. A tooling device for computer numerically controlled machining centers having a spindle, a control rod passing through said spindle, a sliding element, said control rod connected to said sliding element, means connected to said sliding element to control position, a spring loaded telescoping tool holder, an actuating rod in said tool holder adapted to engage said control rod, said actuating rod displacing said control rod to displace said sliding element and electronic coupling means to the axis feed rate of the computer numerical control for controlling spindle deceleration from rapid traverse to zero traverse, a means for producing a signal to transmit work surface location to the computer numerical control to feed the spindle to a programmed depth at a programmed feed rate, said telescoping tool holder having a presetable spring loaded thrust unit arranged to permit further telescoping of said tool holder if tool cutting thrust exceeds preset amount further displacing said actuating rod, before programmed depth is reached signalling said computer numerical control that excessive thrust has been reached.

2. A programmable torque sensing device for computer numerically controlled machining center having a spindle, a control rod passing through said spindle, a sliding element, said control rod connected to said sliding element, an electronic coupling means to said computer numerical control connected to said sliding element to control the position and force of said sliding element, said torque sensing device mounted in said spindle comprising an adapter body, a bearing mounted spindle having a collet mounted in said adapter body, a torque transmitting coupling connecting said spindle to said adapter, a tool actuating rod connected to said torque transmitting coupling to engage said control rod, the amount of torque that can be transmitted by said torque transmitting coupling is a function of the programmed force on said sliding element, when a tool in said spindle collet requires a greater level of torque than determined by the programmed force, then said torque transmitting coupling will cause said tool actuating rod to force said control to displace said sliding element thereby signalling computer numerical control that excessive torque has been reached.

3. A presetable torque sensing device for computer numerically controlled machining centers having a spindle, a control rod passing through said spindle, a sliding element, said control rod connected to said sliding element, an electronic coupling means to said computer numerical control connected to said sliding element to control the position and force of said sliding element, said torque sensing device mounted in said spindle comprising an adapter body, a bearing supported spindle having a collet mounted in said adapter body, a torque transmitting coupling connecting said spindle to said adapter body, a tool actuating rod connected to said torque transmitting coupling adapted to engage said control rod, a settable pressure torque control spring whereby the amount of torque that can be transmitted by said torque transmitting coupling is a function of the pressure of the torque control spring, when a tool in said spindle collet requires a greater level of torque than determined by torque control spring pressure then said torque transmitting coupling, causing said actuating rod to force said control rod to displace said sliding element and thereby signalling said computer numerical control that excessive torque has been produced.

4. A presetable torque sensing and thrust sensing device for computer numerically controlled machining centers having a spindle, a control rod passing through said spindle, a sliding element, an electronic coupling means connected to said sliding element to control the position and force of said sliding element, a torque sensing and thrust sensing device mounted in said spindle comprising an adapter body, a bearing supported spindle having a tool collet, said bearing supported spindle mounted in a sleeve which sleeve is slideably mounted in said adapter body, a torque transmitting coupling connecting said spindle to said adapter body through said spindle sleeve, a tool actuating rod connected to said torque transmitting coupling to engage said control rod, a torque control spring, when a tool in said spindle collet required a greater level of torque then determined by the torque control spring pressure, said torque transmitting coupling will cause said actuating rod to force said control rod to displace said sliding element, thereby signalling said computer numerical control that excessive torque has been reached, and a presetable spring loaded thrust unit arranged to permit said sliding spindle sleeve to telescope into said adapter body when tool cutting thrust exceeds the preset amount thereby causing said actuating rod to force said control rod to displace said sliding element and means for signalling said computer numerical control that excessive thrust has been reached.

5. A presetable torque and surface sensing device for a computer numerically controlled machining center having a machine spindle, a control rod passing through said machine spindle, a sliding element, said control rod connected to said sliding element, electronic coupling means to said computer numerical control, connected to said sliding element to control the position and force of said sliding element, said torque sensing and surface sensing device mounted in said machine spindle comprising an adapter body, a bearing supported spindle having a tool collet mounted in a spindle sleeve which is spring loaded and slideably mounted in said adapter body, a torque transmitting coupling connecting said bearing supported spindle to said adapter body by said spindle sleeve, a tool actuating rod connected to said torque transmitting coupling adapted to engage said control rod, a torque control spring, whereby the amount of torque transmitted by said torque transmitting coupling is a function of the pressure torque control spring, when a tool in said collet requires a greater level of torque then determined by the torque control spring pressure, then said torque transmitting coupling will cause said actuating rod to move said sliding element thereby signalling said computer numerical control that excessive torque has been reached, when the tool in said collet contacts the work surface during the movement of the machine spindle the control rod, actuating rod and sliding element are moved, signalling numerical control for controlling machine spindle deceleration from rapid traverse to zero traverse as the spindle sleeve telescopes into said adapter body, producing a signal to transmit work surface location to the computer numerical control to feed the spindle to a programmed feed rate.

6. A presetable torque sensing, thrust sensing and surface sensing device for computer numerically controlled machining centers, a spindle, a machine head for carrying said spindle, a sliding element in said machine head, a support for said sliding element connected to said machine head, said control rod rotatably connected to said sliding element, an electronic coupling connected to said sliding element to control the position and force of said sliding element, said torque sensing, thrust sensing and surface sensing device mounted in said spindle, and comprising an adapter body, a bearing supported spindle having a tool collet and mounted in a spring loaded spindle sleeve slideably mounted to permit telescoping in said adapter body, a torque coupling connected to said bearing mounted spindle, a tool actuating rod connected to said torque coupling adapted to engage said control rod, a torque control springs when a tool in said spindle collet requires a greater level of torque determined by the torque control spring pressure, then said torque transmitting coupling will cause said actuating rod to force said control rod to displace said sliding element thereby signalling said computer numerical control that excessive torque has been reached, a presetable spring loaded thrust unit arranged to permit said sliding spindle sleeve to telescope into said adapter body, to cause said actuating rod to move, said sliding element to signal the numerical control excessive thrust has been reached, when the tool in said collet contacts the work surface during the movement of the machine spindle the control rod, actuating rod and sliding element are moved, signalling numerical control for controlling machine spindle deceleration from rapid traverse to zero traverse as the spindle sleeve telescopes into said adapter body, producing a signal to transmit work surface location to the computer numerical control to feed the spindle to a programmed feed rate.

7. A presetable torque sensing and thrust sensing device for computer numerically controlled machining centers having a spindle, a control rod passing through said spindle, a sliding element, a linear motor and transducer connected to said sliding element, a torque sensing and thrust sensing device mounted in said spindle comprising an adapter body, a bearing supported spindle having a tool collet, said bearing supported spindle mounted in a sleeve which sleeve is slideably mounted in said adapter body, a torque transmitting coupling compressing a spindle cam ring, actuating rod cam ring and cam balls connecting said spindle to said adapter body through said spindle sleeve, a tool actuating rod connected to said torque transmitting coupling to engage said control rod, a torque control spring, when a tool in said spindle collet requires a greater level of torque than determined by the torque control spring pressure, said torque transmitting coupling will cause said actuating rod to force said control rod to displace said sliding element and said transducer, a presetable spring loaded thrust unit arranged to permit said sliding spindle sleeve to telescope into said adapter body when tool cutting thrust exceeds the preset amount thereby causing said actuating rod to force said control rod to displace said sliding element and said transducer signalling said computer numerical control that the preset torque or preset thrust has been reached allowing computer numerical control to monitor the amount of spring deflection which determines actual torque or thrust and to control feed rate and machining cycle durations.

8. A telescoping tool adapted for computer numerically controlled machining centers having a spindle, a control rod passing through said spindle, a sliding element, said control rod passing through said spindle, said control rod connected to said sliding element, a linear motor and transducer connected to said sliding element to control the position and force of said sliding element, a spring loaded telescoping tool holder, an actuating rod in said tool holder adapted to engage said control rod, said actuating rod displacing said control rod to displace said sliding element to displace said transducer, said transducer having electronic coupling means to the axis feed rate of the computer numerical control for controlling spindle deceleration from rapid traverse to zero traverse, said transducer producing a signal to transmit work surface location to the computer numerical control to feed the spindle to a programmed depth at a programmed feed rate, said telescoping tool adapter having a presetable spring loaded thrust unit comprising a spring guide body, a thrust nut, a spring, inner thrust collar, outer thrust collar, and snap ring arranged to permit further telescoping of said tool holder if tool cutting thrust exceeds preset amount further displacing said actuating rod, and said transducer before programmed depth is reached signalling said computer numerical control that preset thrust has been reached allowing computer numerical control to monitor amount of spring deflection which determines actual thrust load and to control feed rate or machining cycle duration.

9. A programmable torque sensing device for computer numerically controlled machining centers having a spindle, a control rod passing through said spindle, a sliding element, said control rod connected to said sliding element, a linear motor and transducer having electronic coupling means to said computer numerical control connected to said sliding element, to control the position and force of said sliding element, said torque sensing device mounted in said spindle comprising an adapter body, a bearing mounted spindle having a collet mounted in said adapter body, a torque transmitting coupling comprising a spindle cam ring, actuating rod cam ring and cam balls, connecting said spindle to said adapter, a tool actuating rod connected to said torque transmitting coupling to engage said control rod, whereby the position of said sliding element is set to zero and positioning loop is closed when said spindle control rod is engaged with said tool actuating rod at that the amount of torque being transmitted by the torque coupling during a machining cycle is being monitored by the computer numerical control by means of the level of current necessary to maintain zero set position as the cutting load changes.

10. A presetable torque sensing device for computer numerically controlled machining centers having a spindle, a control rod passing through said spindle, a sliding element, said control rod connected to said sliding element, a linear motor and transducer having electronic coupling means to said computer numerical control connected to said sliding element to control the position and force of said sliding element, said torque sensing device mounted in said spindle comprising an adapter body, a bearing supported spindle having a collet mounted in said adapter body, a torque transmitting coupling comprising a spindle cam ring, actuating rod cam ring and cam balls, connecting said spindle to said adapter body, a tool actuating rod connected to said torque transmitting coupling adapted to engage said control rod, a settable pressure torque control spring whereby the amount of torque that can be transmitted by said torque transmitting coupling is a function of the pressure of the torque control spring when a tool in said spindle collet requires a greater level of torque than determined by torque control spring pressure than said torque transmitting coupling, causing said actuating rod to force said control rod to displace said sliding element and said transducer thereby signalling said computer numerical control when the preset torque has been reached allowing computer numerical control to monitor the amount of deflection of said spring which determines actual torque and to control feed rate and machining cycle duration.

11. A presetable torque and surface sensing device for a computer numerically controlled machining center having a machine spindle, a control rod passing through said machine spindle, a sliding element, a linear motor and transducer having electronic coupling means to said computer numerical control, connected to said sliding element to control the position and force of said sliding element, said torque sensing and surface sensing device mounted in said machine spindle comprising an adapter body, a bearing supported spindle having a tool collet, mounted in a spindle sleeve which is spring loaded by a spring and slideably mounted in said adapter body, a torque transmitting coupling comprising a spindle cam ring, an actuating rod cam ring and cam balls, connecting said bearing supported spindle to said adapter body by said spindle sleeve, a tool actuating rod connected to said torque transmitting coupling adapted to engage said control rod, a torque control spring, whereby the amount of torque transmitted by said torque transmitting coupling is a function of the torque control spring pressure when the tool in said collet contacts the work surface during the movement of the machine spindle, said transducer, control rod, actuating rod and sliding element are displaced signalling numerical control for controlling machine spindle deceleration from rapid traverse to zero traverse as the spindle sleeve telescopes into said adapter body, said transducer producing a signal to transmit work surface location to the computer numerical control to feed the spindle to a programmed depth when preset torque has been reached, torque transmitting coupling will deflect said torque control spring causing said actuating rod to move said sliding element and said transducer thereby signaling said computer numerical control that preset torque has been reached allowing said computer numerical control to monitor amount of spring deflection which determines actual torque and to control the feed rate and machining cycle duration.

12. A presetable torque sensing, thrust sensing and surface sensing device for a computer numerically controlled machining center having a machine spindle, a control rod passing through said machine spindle, a sliding element, said control rod connected to said sliding element, a linear motor and transducer having electronic coupling means to said computer numerical control, said motor and transducer connected to to said sliding element to control the position and force of said sliding element, said torque sensing, thrust sensing and surface sensing device mounted in said machine spindle comprising an adapter body, a bearing supported spindle, a spindle sleeve in which said spindle is mounted, a tool collet mounted in said spindle, said spindle sleeve spring loaded and slideably mounted in said adapter body, a torque transmitting coupling comprising a spindle cam ring, an actuating rod cam ring and cam balls, connecting said bearing supported spindle to said adapter body by said spindle sleeve, a tool actuating rod connected to said torque transmitting coupling adapted to engage said control rod, a torque control spring, whereby the amount of torque transmitted by said torque transmitting coupling is a function of the torque control spring pressure, a presetable spring load thrust unit comprising a thrust spring body, a sliding thrust collar, a calibrated thrust spring, a fitting collar and snap ring, arranged to permit said sliding spindle sleeve to telescope into said adapter body, the amount of thrust transmitted is a function of said thrust control spring, when the tool in said collet contacts the work surface during the movement of the machine spindle, the transducer, control rod, actuating rod and sliding element are displaced signalling computer numerical control to control axis feed rate for controlling machine spindle deceleration from rapid traverse to zero traverse as said spindle sleeve telescopes into said adapter body until said spindle load thrust unit is seated in said adapter body, said transducer, producing a signal to transmit work surface location to the computer numerical control to feed the spindle to programmed depths, when either preset torque or thrust is exceeded, either said torque control spring or said thrust control spring will deflect causing said tool actuating rod to move said sliding element and said transducer, thereby signalling said computer numerical control to monitor the amount of spring deflection which determines actual torque or actual thrust and to correct feed rate and machining cycle duration.

* * * * *